March 10, 1964

E. E. WILSON 3,124,200

PROPELLER DEVICE

Filed July 26, 1962

INVENTOR.
EVERETT E. WILSON
BY
Gregory S. Delgouresov
ATTORNEY

March 10, 1964 E. E. WILSON 3,124,200
PROPELLER DEVICE
Filed July 26, 1962 3 Sheets-Sheet 2
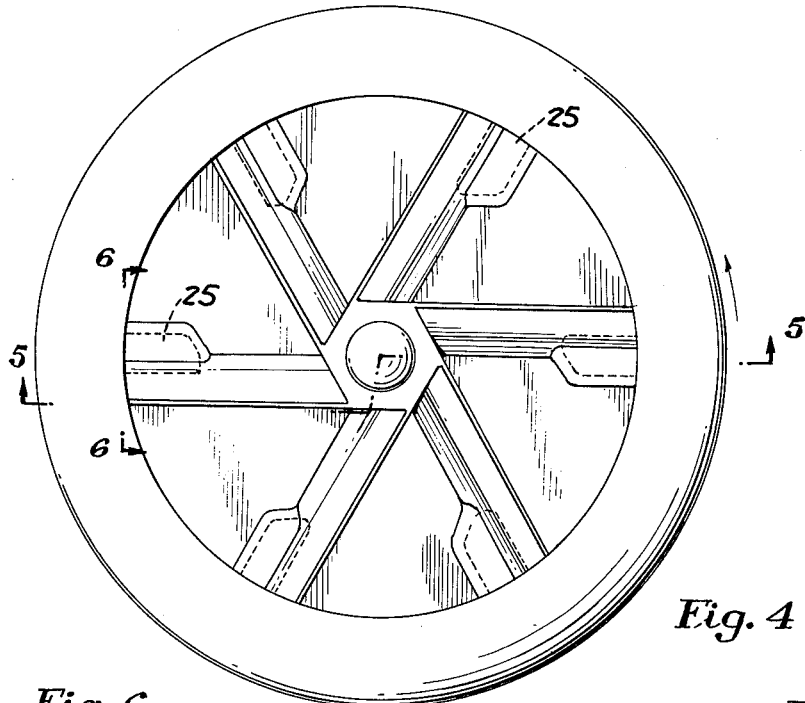
Fig. 4
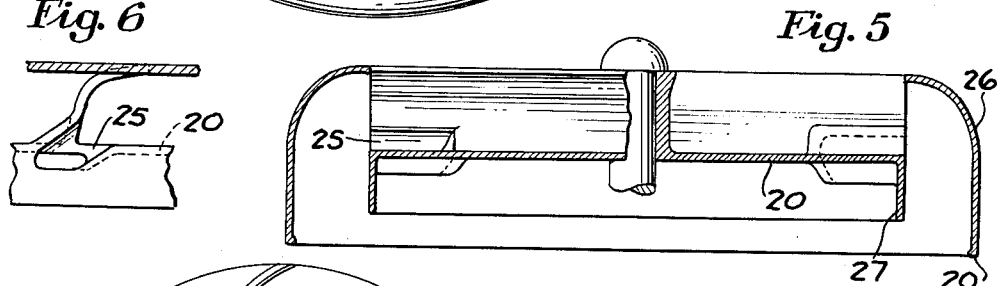
Fig. 6  Fig. 5
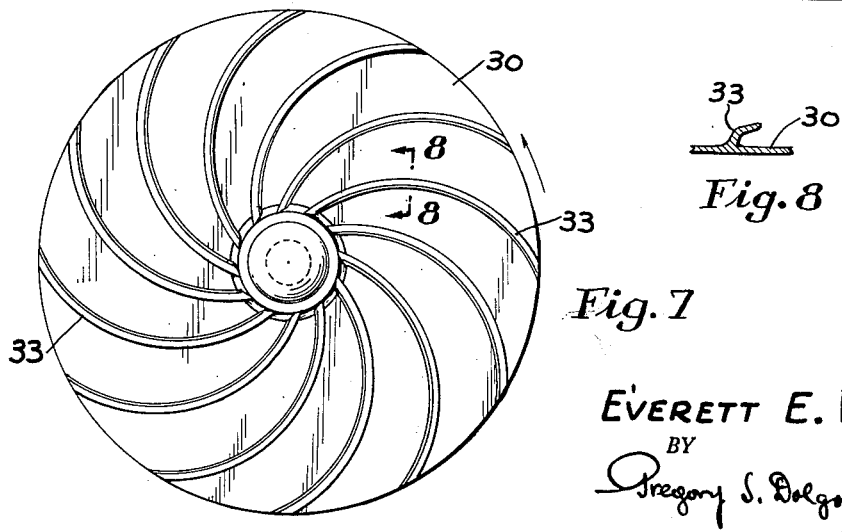
Fig. 8
Fig. 7
INVENTOR.
EVERETT E. WILSON
BY
Gregory S. Dolgorukov
ATTORNEY March 10, 1964      E. E. WILSON      3,124,200
PROPELLER DEVICE Filed July 26, 1962      3 Sheets-Sheet 3

INVENTOR.
EVERETT E. WILSON
BY
ATTORNEY

United States Patent Office 3,124,200
Patented Mar. 10, 1964

3,124,200
PROPELLER DEVICE
Everett E. Wilson, 17140 Hartwell, Detroit, Mich.
Filed July 26, 1962, Ser. No. 214,786
7 Claims. (Cl. 170—135)

This invention relates to devices for producing axial thrust by their rotation in a fluid such as air or water. The present application is a continuation in part of my co-pending application, Serial No. 766,987, filed October 13, 1958, and now abandoned, for Propeller Device.

Devices of the above general nature which, at the present time, have received an almost universal application are in the form of the so-called screw propellers, and such screw propellers designed on the basis of the characteristics of the particular fluid, such as water and air, are widely used for aircraft and marine propulsion. Generally, screw propellers for marine use are of considerably smaller diameter than propellers used for aircraft for absorbing comparable power and may have more blades than the aircraft propellers. Three-blade propellers have now become particularly popular for larger aircraft, while four-blade propellers have been extensively used for marine propulsion, particularly for larger craft.

Generally, the axial thrust produced by a screw propeller depends on the degree of vacuum created on the surface of the blade on the side of the direction of its travel because of movement of the blade through the fluid at a certain angle to the general plane of rotation of the blade, and on the area of the blade at which such partial vacuum or reduced pressure is caused to act. The faster the rotation of the propeller blades, the greater is the degree of vacuum so created. Also, the greater the number of the blades on the propeller, the greater is the area at which fluid pressure acts to produce axial thrust.

However, limitation for both of the above factors exists in the fact that increase both in the speed of rotation and/or in the number of the blades beyond a certain limit, determined primarily by the nature of the fluid, causes rarification of the fluid to such an extent that in spite of increase in the degree of vacuum, the fluid pressure from the opposite side begins to decrease in a degree nullifying the beneficial effect of the increased vacuum. Therefore, limitation in the number of propeller blades, usually to three or four, determines the maximum area at which the fluid pressure acts on the propeller and, therefore, determines the total axial thrust produced thereby. In case of aircraft propellers having three blades, such area may be equal, in effect, to only approximately 15%–20% of the total circular area determined by the radius of the propeller.

One of the objects of the present invention is to provide an improved propeller device whereby the effective area on which fluid pressure acts for producing the axial thrust is greatly increased as compared with screw propellers, and whereby a much greater total axial thrust is produced by my propellers without increasing the radius thereof.

Another object of the present invention is to provide an improved propeller having virtually no limitation as to the number of propeller blades or the speed of their rotation in a particular fluid medium.

A further object of the present invention is to provide an improved propeller device for use in a fluid media, which propeller device absorbs and converts into effective axial thrust a much greater power than a screw propeller of comparable size and weight.

A still further object of the present invention is to provide an improved propeller device which is more efficient in converting into axial thrust the power delivered to it by the engine or the craft.

A still further object of the present invention is to provide an improved propeller device in which fluid pressure producing axial thrust acts substantially on the entire circular area determined by the radius of the propeller rather than on only a small portion thereof determined by the area of the few blades of the propeller as is the case with screw propellers.

A still further object of the present invention is to provide an improved propeller device which is particularly advantageous as a lifting or lift producing device.

It is an added object of the present invention to produce an improved propeller device of the above nature, which propeller device is simple and rugged in construction, dependable in operation, and is relatively inexpensive to manufacture.

Further objects and advantages of this invention will be apparent from the following description and appended claims, reference being had to the accompanying drawings forming a part of this specification, wherein like reference characters designate corresponding parts in the several views.

FIG. 4 is a view similar in part to FIG. 1 but showing a modified construction of my improved propeller.

FIG. 5 is a view taken in the direction of the arrows on the section plane 5—5 of FIG. 4.

FIG. 6 is a fragmentary sectional view taken in the direction of the arrows on the section plane passing through the section line 6—6 of FIG. 4.

FIG. 7 is a view similar in part to FIGS. 1 and 4 but illustrating a still further modification of my improved propeller.

FIG. 8 is a fragmentary sectional view taken in the direction of the arrows on the section plane passing through the line 8—8 of FIG. 7.

Figure 1:
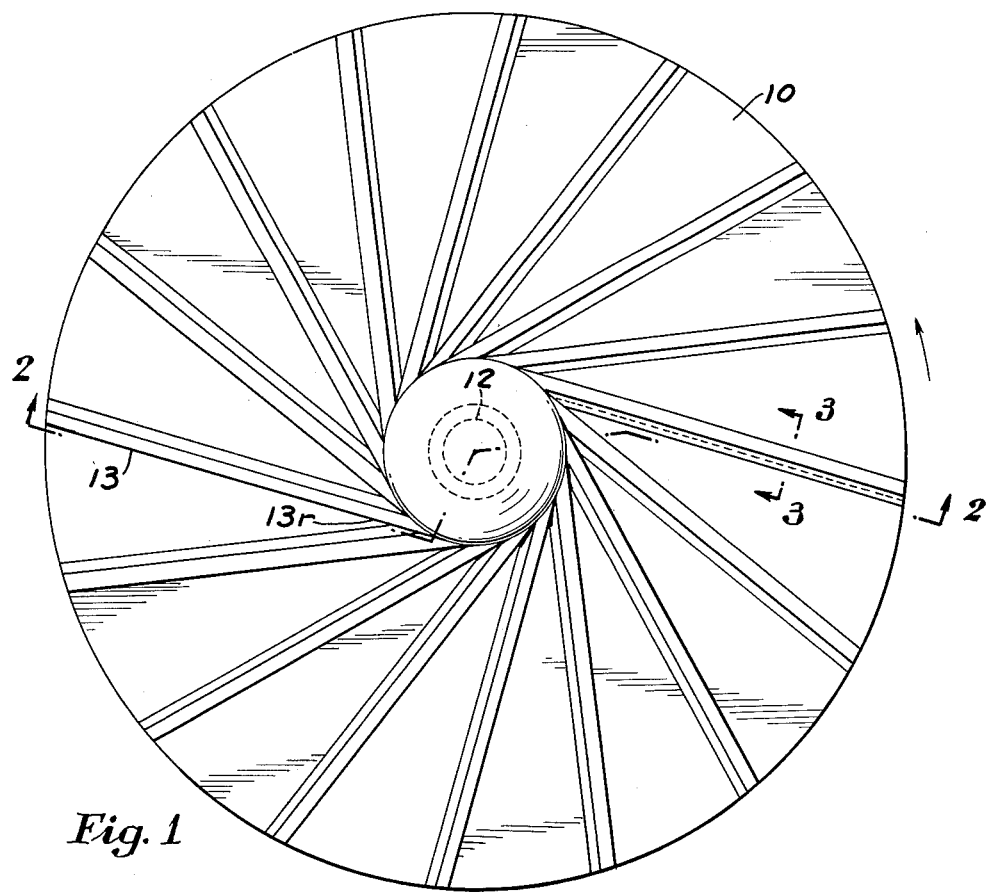
FIG. 1 is a front view of a propeller device embodying the present invention.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein is for the purpose of description and not of limitation.

It shall also be understood that the theories of operation of my improved propeller device propounded herein constitute my present understanding of the physical phenomena taking place, and that I do not wish to be bound by such theories since the same may be modified or expanded and become susceptible of more precise formulation as my work on further developing the present invention progresses.

In accordance with the invention I discard the former practice of constructing propellers in such a manner that the axial thrust is produced by the propellers because of the fluid pressure acting on the propeller blades only. Since the total area of the propeller blades constitutes only a small portion of the circular area determined by the radius of the propeller, the thrust so produced is only a small portion of the thrust that would be produced if the same pressure acted on the entire circular area of the propeller. In accordance with the invention I provide a shield or disc which occupies substantially the entire circular area determined by the radius of the propeller. I provide means adapted to evacuate fluid from the front surface or face of such shield for the purpose of creating vacuum or partial vacuum over substantially the entire area of said front surface or face and thus to cause the fluid on the other side of the shield to exert pressure on the entire area of the shield for the purpose of producing axial thrust to be used for propulsion purposes. Evacuation of the fluid from the front surface of the disc may be made primarily toward and beyond the periphery of the propeller device, i.e. in the radial direction. However, in accordance with the invention all or some of the fluid may be passed in accordance with the invention on the pressure side of the disc in order to increase the fluid pressure operating to produce axial thrust. In accordance with the invention I also provide means to obstruct the flow of the fluid around the periphery of the device which flow would tend to decrease the vacuum at the front face as well as to decrease the pressure at the back face and, therefore, decrease the axial thrust. It should be appreciated that it is the area of the surface at which the vacuum acts rather than the thickness of the layer of the vacuum that is of critical importance. Therefore, the present invention contemplates constructions in which such layer of vacuum may be very thin, such as only 1/16" but extending over considerable areas and, therefore, producing uncomparably larger axial thrust than can be produced by relatively thick layers of vacuum acting over a limited area, as is the case in screw propellers.

It should also be appreciated that forward movement of a propeller affects distribution of vacuum as well as pressure over its surfaces. Therefore, my improved propeller is particularly advantageous as an aircraft lifting device rather than a device for imparting high forward speed to aircraft. Therefore, use of my improved propeller device in helicopters and in jet propelled aircraft for raising the same into the air is within particular contemplation of the present invention.

Figure 2:
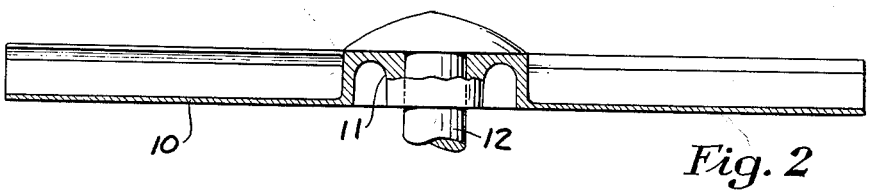
FIG. 2 is a sectional view of the propeller of FIG. 1, taken in the direction of the arrows on the broken section plane passing through the line 2—2 of FIG. 1.
Figure 3:
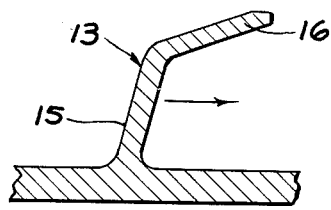
FIG. 3 is a fragmentary sectional view taken in the direction of the arrows on the section plane passing through the section line 3—3 of FIG. 1.

In the drawings there is shown, by way of example, three exemplary propeller constructions embodying my invention. Referring specifically to the construction illustrated in FIGS. 1-3, the device illustrated therein comprises a round shield or disc 10 including a hub 11 adapted to receive a driving shaft 12. On the front surface of the disc 10 there is provided a plurality, in the present instant 16, of blade elements 13 extending in the radial direction but with the roots 13r of said blade elements advanced in the direction of rotation to produce an arrangement of the blade elements at an angle to the respective radii. FIG. 3 illustrates a cross section of one of the blade elements 13. Referring to said figure, the blade element incorporates a spacing portion 15 and a cover portion 16.

It will be understood, in view of the foregoing, that if the disc 10 is rotated at a high speed, such as 20,000 r.p.m., pressure will be created in front of the elements 13 and a partial vacuum behind the same. Because of the inclined arrangement of the blades and centrifugal force acting on the fluid in the pressure zone in front of the elements 13, the fluid will move outwardly and will thus be pumped out and evacuated from the front face 10f of the disc 10. An increase in the speed of the fluid so flowing will greatly reduce the pressure thereof in accordance with the well-understood principle usually referred to as Bernoulli's Theorem, thus greatly reducing the pressure also in front of the blade elements 13. Since the smooth back face 10b of the disc 10 is not capable of creating a vacuum in the manner of the blade elements 13, the pressure of the fluid at such back face will act on said face and will produce forces acting forwardly and aggregating to a total thrust equal to the integrated amount of separate thrust forces acting on the unit areas of the disc 10.

It should be appreciated that while the difference of fluid pressures at the front face and the back face of the disc 10 may be relatively small and amount to only a few pounds per square inch, because of the greatly increased effective area on which such pressure acts, a very high total axial thrust is produced, which thrust greatly exceeds that which can be produced by a propeller with only two or three blades.

It should be appreciated that if the disc 10 would begin to move forwardly at a very high linear speed, the pressure at the back face 10b thereof would greatly decrease and thus would disturb the above explained relationship. Therefore, my improved propeller device is intended for producing exceedingly high thrust forces acting at relatively slow rate of linear speed. My improved propeller device is particularly advantageous for lift purposes, such as for lifting aircraft into the air before its forwardly pulling conventional propellers or jet propulsion engines are set into operation to impart to it high forward velocity.

By virtue of such an expedient, the length of the required runways is greatly decreased, and in many cases may be eliminated altogether, thus producing vertically rising and vertically landing aircraft. My improved propeller device may, therefore, be embodied or incorporated into the wings of aircraft or arranged either above or below the aircraft in a plan of its movement to decrease its fluid resistance in the forward movement of the aircraft.

FIGS. 4, 5 and 6 illustrate an improved propeller device constructed in accordance with the concept described above but having provided in its disc 20 apertures 25 adapted to pass the fluid from the front face to the back face of the propeller device. This expedient is intended, primarily, to restore the pressure at the back face of the disc 20, in cases where said pressure is reduced because of the forward movement of the disc as explained above, or to build up pressure in cases where the disc 20 is at rest or is moving very slowly. Rearwardly directed flanges 26 are provided at the tips of the blade elements 23 of my propeller device as illustrated in FIG. 4 in order to decrease tip losses and to reduce the tendency of the fluid to flow from the back face of the disc 20 to the front thereof.

Auxiliary flanges 27 operate to prevent flow of the air toward the front of the propeller device. Both flanges 26 and 27 also form a fluid directing duct guiding the fluid from the front to the back of the disc 20.

FIGS. 7 and 8 illustrate a propeller device embodying my present invention but constructed for a more advantageous machining. In the construction of FIG. 6 the disc 20 and the blade elements 33 are made of an integral construction and are machined from a solid piece of metal by removing the metal between the adjacent blade elements 33. The blade elements 33 may be arcuate in shape, i.e. be portions of a circle and, therefore, afford possibility of easier machining with the aid of rotating milling cutters. The blade elements 33 may be very small in their transverse dimensions and extend only 1/8" or even 1/16" from the face 30 of the propeller disc. It will be understood that the construction of FIGS. 7 and 8 requires a particularly high speed of rotation for its proper functioning. Therefore, care should be exercised that such rotation does not exceed the limits of the strength of the material used, since exceedingly high centrifugal forces may develop within the structure of the propeller device at such speeds.

It will be understood that while my improved propeller devices have been described above with reference to aircraft, they can be used with equal success for water craft. However, in designing propeller devices embodying the present invention for use in a more dense media, such as water, oil, as well as other liquids, their radial extent thereof should be correspondingly reduced in view of the increased density of the fluid.

Figure 9:
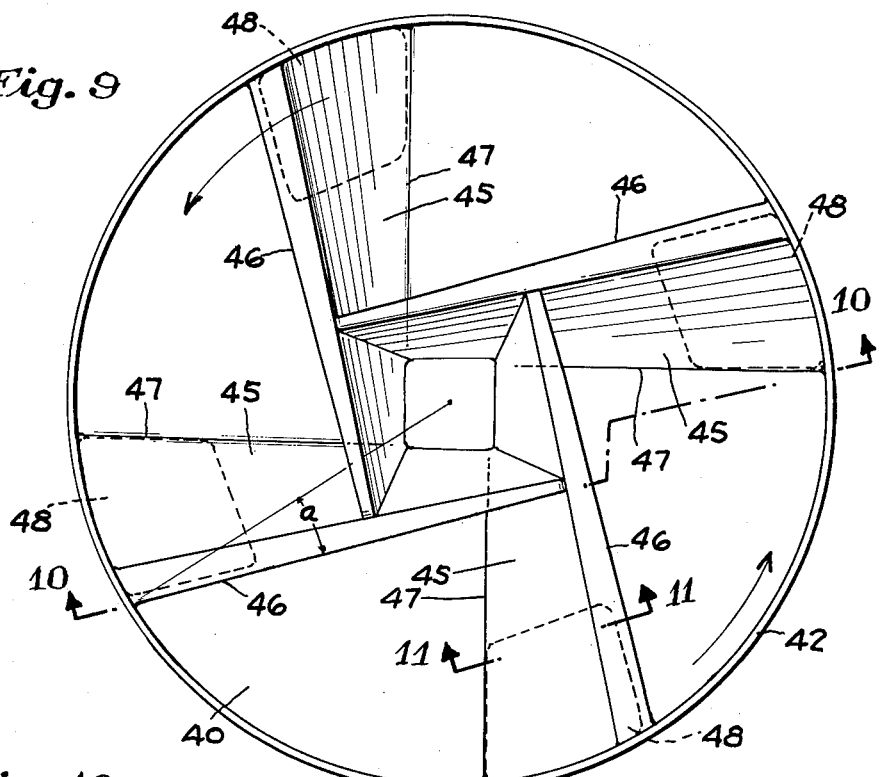
FIG. 9 is a front view of a propeller device of a still further modified construction embodying the present invention.
Figure 10:
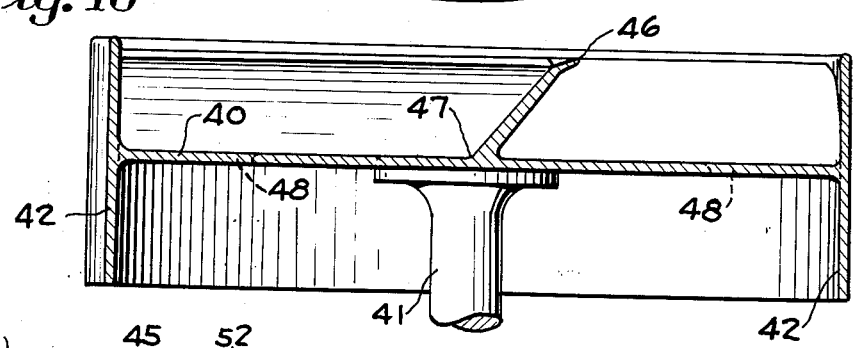
FIG. 10 is a sectional view taken in the direction of the arrows on the plane passing through the broken section line 10—10 of FIG. 9.
Figure 11:
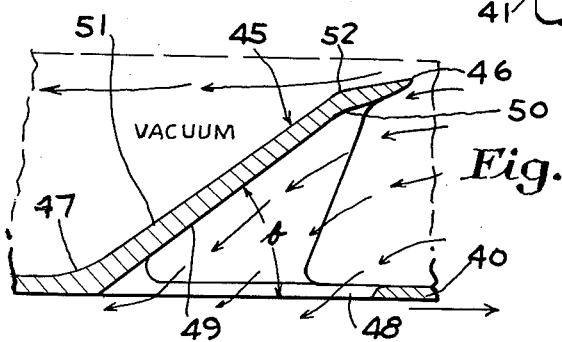
FIG. 11 is a fragmentary sectional view taken in the direction of the arrows on the plane passed through the section line 11—11 of FIG. 9.

FIGS. 9-11 illustrate another modified construction embodying the present invention. Referring specifically to said figures, the propeller device illustrated therein comprises a flat disc 40 provided with a shaft 41 for rotation of the device in a fluid medium. Around the periphery of the disc 40 there is provided a cylindrical rim 42 extending axially, i.e. parallel to the axis of the disc 40 and the shaft 41, for a certain distance both in front and in back of said disc 40. The disc 40 and the rim 42 may be made as separate elements and fitted together, or they may be made as an integral construction as illustrated.

On the front surface of the disc 40 there is provided a plurality, in the present embodiment four, of blade elements 45. These elements extend from the middle portion of the disc 40 outwardly, i.e. toward the periphery thereof, as illustrated. The inner ends of the blade elements 45 are offset from the center of the disc, as illustrated, in order that in rotation they lead the outer ends of their respective blade elements. The angle $a$ of the offset, shown in FIG. 9 on one blade only, is determined primarily by the nature of the fluid and the speed at which the device is intended to operate, and may be determined experimentally. The angle of 17°-20° gives very good results for air at a speed of approximately 7000 r.p.m. The leading edges 46 of the blade elements may extend substantially parallel to the plane of the disc 40, as is best shown in FIG. 10, while the trailing edges 47 of said elements are disposed at or merge with the disc 40. The outer ends of the blade elements 45 are wider than the inner ends thereof, as illustrated.

The blades 45 slope downwardly from their leading edges 46 toward their trailing edges 47, as is best illustrated in FIG. 11. The angle $b$ of said slope is so selected as to provide both a smooth flow of the scooped fluid from the top surface of the disc 40 to the bottom surface thereof through the aperture 48. Obviously, the smaller this angle, the smaller will be such flow. However, the angle $b$ should also be steep enough to create a vacuum behind the blade elements, which requirement presupposes that angle $b$ should be sufficiently steep to cause the air to "tear away" from the upper surface 51 of the sloping portions of the blade. The increase in angle $b$ over what would be desired for the smooth flow of the fluid from the front to the back surface of the disc 40 is desired for a number of reasons. One such reason is the desirability that such flow will not convert all of the energy of pressure of the fluid into the energy of velocity and thus cause the flowing fluid to cause a vacuum under the blades. It is desired to have some pressure under the sloping portions of the blades in spite of the flow of fluid within said region.

The slope of the body of each of the blades 45 is much smaller adjacent the leading edges 46, and the transition on the undersurface 49 of the blade from such decreased slope to the prevailing slope is very gradual, as indicated at 50. On the other hand, the transition between such two slopes on the upper surface 51 of the blade may be made more abrupt, as indicated at 52, in order to promote desired break of the flowing air from the surface 51 for the purpose of creating a partial vacuum thrust.

The height of the blade elements is determined by the nature of the fluid, the intended operative speeds of the device and the number of blade elements used. For liquids, a relatively small number of wide blade elements is desired, and the operative speeds are usually much lower than those for air. The embodiment illustrated in FIGS. 9-11 is suitable for water, although three blades may be more advantageous in water propellers. It is also suitable for air with relatively low speeds of rotation of the propeller, such as 7000 r.p.m. For higher speeds of rotation, a greater number of blade elements of relatively lower height, such as illustrated in FIGS. 1-2, may be more advantageous. To bring the construction of FIGS. 1-2 within the concept of the modification shown in FIGS. 9-11, the apertures such as 48 would have to be provided in the disc 10 thereof under the blades 13, and the rim such as 42 should be provided around the periphery of said disc 10.

As illustrated in FIGS. 9-11 apertures such as 48 are provided in the disc 40 near the outer ends of the blade elements. Such construction is advantageous since the fluid in rotation of the device is moved outwardly by the action of the blades and particularly because of the offset thereof and also because of the action of centrifugal force acting on the rotated fluid to move it outwardly. Therefore, extending the apertures toward the center of the disc may not serve any useful purpose and even not be desirable since they may promote a return flow of the fluid from the back of the disc 10 to the front thereof, thus decreasing the forward thrust.

As shown in FIGS. 9-11, the rim 42 extends forwardly of the disc 40 for a distance somewhat greater than the height of the blade elements 45, and rearwardly for a still greater distance.

Provision of the rim 42 in the construction of FIGS. 9-11 may also be coupled with the provision of a shroud such as 26 illustrated in FIG. 5, particularly with the use of a tear drop shaped motor used for driving the shaft 41.

There is thus provided an improved propeller device whereby the objects of the present invention and numerous additional advantages are attained.

I claim:

1. A device for producing axial thrust by being rotated in air, said device comprising a shaft, a plurality of outwardly extending blades inclined to the plane normal to the axis of their rotation and secured to said shaft for rotation therewith, each of said blades having a leading edge and a trailing edge, with said edges extending in two substantially parallel planes, with the trailing edges of said blades being extended in a plane normal to the axis of said shaft to form a disc and thereby to close the spaces between the adjacent trailing edges but to leave openings in said disc, with each of said openings extending from the line of projection of the leading edge of the respective blade on said disc substantially to the edge of the trailing edge and to the peripheral edge of said disc, and a forwardly projecting rim provided along the circular peripheral edge of said disc and sealingly secured thereto with the inner surfaces of said rim being cylindrical.

2. The device defined in claim 1 with the forward edges of said rim lying substantially within the plane of the leading edges of the blades.

3. The device defined in claim 1, with the inner ends of said blades being offset from the axis of rotation of said shaft in the direction to lead in rotation the outer ends of the blades.

4. A device for producing axial thrust by being rotated in air, said device comprising a shaft, a plurality of outwardly extending blades inclined to the plane normal to the axis of their rotation and secured to said shaft for rotation therewith, each of said blades having a leading edge and a trailing edge, with the trailing edges of said blades being extended in a plane normal to the axis of said shaft to form a disc and thereby to close the space between the adjacent trailing edges but to leave openings in said disc, with each of said openings extending from the line of projection of the leading edge of the respective blade on said disc substantially to the edge of the trailing edge and to the peripheral edge of said disc, an air tight hub extending forwardly from said disc and formed by the inner ends of said blades, and a forwardly extending rim projecting from the peripheral edges of said disc substantially to the plane of said leading edges of the blades and sealingly secured to the peripheral edges of said disc.

5. The device defined in claim 4 and including a rim similar to the forwardly projecting rim but extending rearwardly from the disc.

6. The device defined in claim 1, with the blades thereof comprising in cross section a leading portion which is substantially flat for an appreciable distance from the leading edge and is inclined with respect to the plane normal to the axis of its rotation, and a trailing portion merging with said leading portion and extending to the disc at a greater angle to said plane than the leading portion, for merging therewith.

7. A device for producing axial thrust by being rotated in air, said device comprising a tubular hub, a plurality of outwardly extending blades inclined to the plane normal to the axis of their rotation and having their inner ends secured to said hub, with the leading edges of said blades extending substantially in the plane of the forward edges of said hub, and with the trailing edges of said blades extending in a plane normal to the axis of rotation thereof to form a disc, said disc being provided under the outer ends of each of said blades with an opening leading to the back side of the disc for passage of the air thereto, a rearwardly extending rim provided at the peripheral edges of the disc and sealingly secured thereto, and an annular flange connected to the outer ends of said blades and extending at the places of juncture therewith in the plane of said leading edges but curving rearwardly therefrom to extend beyond the rear edges of said rim.

References Cited in the file of this patent

UNITED STATES PATENTS

| | | |
|---|---|---|
| 595,571 | Johnsen | Dec. 14, 1897 |
| 1,072,189 | Spark | Sept. 2, 1913 |
| 1,541,776 | Mercer | June 9, 1925 |
| 1,966,461 | Quast | July 17, 1934 |
| 2,138,999 | Clark | Dec. 6, 1938 |
| 2,270,686 | Moore | Jan. 20, 1942 |